United States Patent [19]

Bone et al.

[11] 4,104,877
[45] Aug. 8, 1978

[54] SUSPENSION SYSTEM FOR NOZZLE OF JET PROPELLED VEHICLE

[75] Inventors: Geoffrey Edward Bone, Crowthorne; Peter Baguley Allen, Wokingham, both of England

[73] Assignee: Sperry Rand Limited, Bracknell, England

[21] Appl. No.: 790,357

[22] Filed: Apr. 25, 1977

[30] Foreign Application Priority Data

Apr. 30, 1976 [GB] United Kingdom ............... 17637/76

[51] Int. Cl.$^2$ ............................................... F02K 9/00
[52] U.S. Cl. ...................................... 60/230; 60/232; 60/271; 239/265.35
[58] Field of Search .................. 60/232, 271, 230; 239/265.35; 285/95, DIG. 1

[56] References Cited

U.S. PATENT DOCUMENTS

| 3,401,887 | 9/1968 | Sheppard | 60/232 |
| 3,659,788 | 5/1972 | Oldfield et al. | 239/265.35 |
| 3,912,172 | 10/1975 | Bolner | 239/265.35 |

Primary Examiner—Robert E. Garrett
Attorney, Agent, or Firm—Howard P. Terry

[57] ABSTRACT

A suspension system for a pivotal nozzle of a jet propelled vehicle having a gas generator operable to effect propulsion of the vehicle, the system comprising a plurality of actuators connected to the exhaust nozzle and operable to effect pivotal movement thereof to steer the vehicle in a desired direction. Each actuator comprises a movable member connectible on one side to a source of fluid power to effect nozzle movement with the other side of the member being interconnected with said other side of each other actuator movable member to form a fluid suspension for the nozzle. In use, the suspension is pressurized to produce a force acting on the nozzle in a direction opposite to the load imposed on the nozzle by the gas from the gas generator acting thereon.

10 Claims, 4 Drawing Figures

SUSPENSION SYSTEM FOR NOZZLE OF JET PROPELLED VEHICLE

This invention relates to suspensions for nozzles of jet propelled vehicles.

It is well known to provide a nozzle of a jet propelled vehicle with the facility of pivotal movement whereby the jet of gas propelling the vehicle can be deflected to effect steering of the vehicle. A common form of mounting for such a nozzle is that of a part-spherical bearing which provides the desired universality of movement but it is found that the load on the bearing caused by the propulsion gasses acting on the nozzle and bearing components is such as to make movement of the nozzle extremely difficult. Thus, it is necessary to provide actuators to effect nozzle movement of a power far higher than would otherwise be required if this high bearing load were not present. An alternative arrangement which gives rise to lower frictional characteristics in the presence of the bearing load imposed by the propulsion gasses is that of a gimbal arrangement but this has to be made comparatively massive in order to withstand the bearing load, whereby it becomes bulky and heavy and hence unacceptable in some applications.

It is an object of the present invention to provide a suspension for a nozzle of a jet propelled vehicle which reduces the power required to effect nozzle movement and hence gives rise to a more compact nozzle actuation system.

According to the present invention there is provided a suspension system for a pivotal nozzle of a jet propelled vehicle having a gas generator operable to effect propulsion of the vehicle, the system comprising a plurality of actuators connected to the exhaust nozzle and operable to effect pivotal movement thereof to steer the vehicle in a desired direction, each actuator comprising a movable member connectible on one side to a source of fluid power to effect nozzle movement with the other side of the member being interconnected with said other side of each other actuator movable member to form a fluid suspension for the nozzle, in use the suspension being pressurised to produce a force acting on the nozzle in a direction opposite to the load imposed on the nozzle by the gas from the gas generator acting thereon.

Preferably, each actuator is in the form of an hydraulic piston and cylinder and the suspension filled with hydraulic fluid. However, other forms of actuators may be employed such as, for example, rotary vane actuators.

The fluid suspension may be pressurised by means having an input connected to the output of the gas generator so that the suspension is pressure referenced to the gas generator the output of which imposes the load on the nozzle which the suspension is designed to offset. Alternatively, the suspension may be pressurised by so mounting the nozzle to permit limited movement thereof relative to the actuators as a result of the load imposed by the gas generator output.

The nozzle may be mounted for pivotal movement in a part-spherical bearing or in a gimbal ring, for example.

Since the movable members of the actuators are interconnected, the operation of one or more actuators to effect nozzle movement merely results in fluid being transferred from each actuator being operated to the other actuators without disturbing the operation of the suspension.

Various embodiments of the invention as applied to jet propelled guided missiles will now be described in greater detail, by way of example, with reference to the accompanying drawings, in which.

Figure 1:
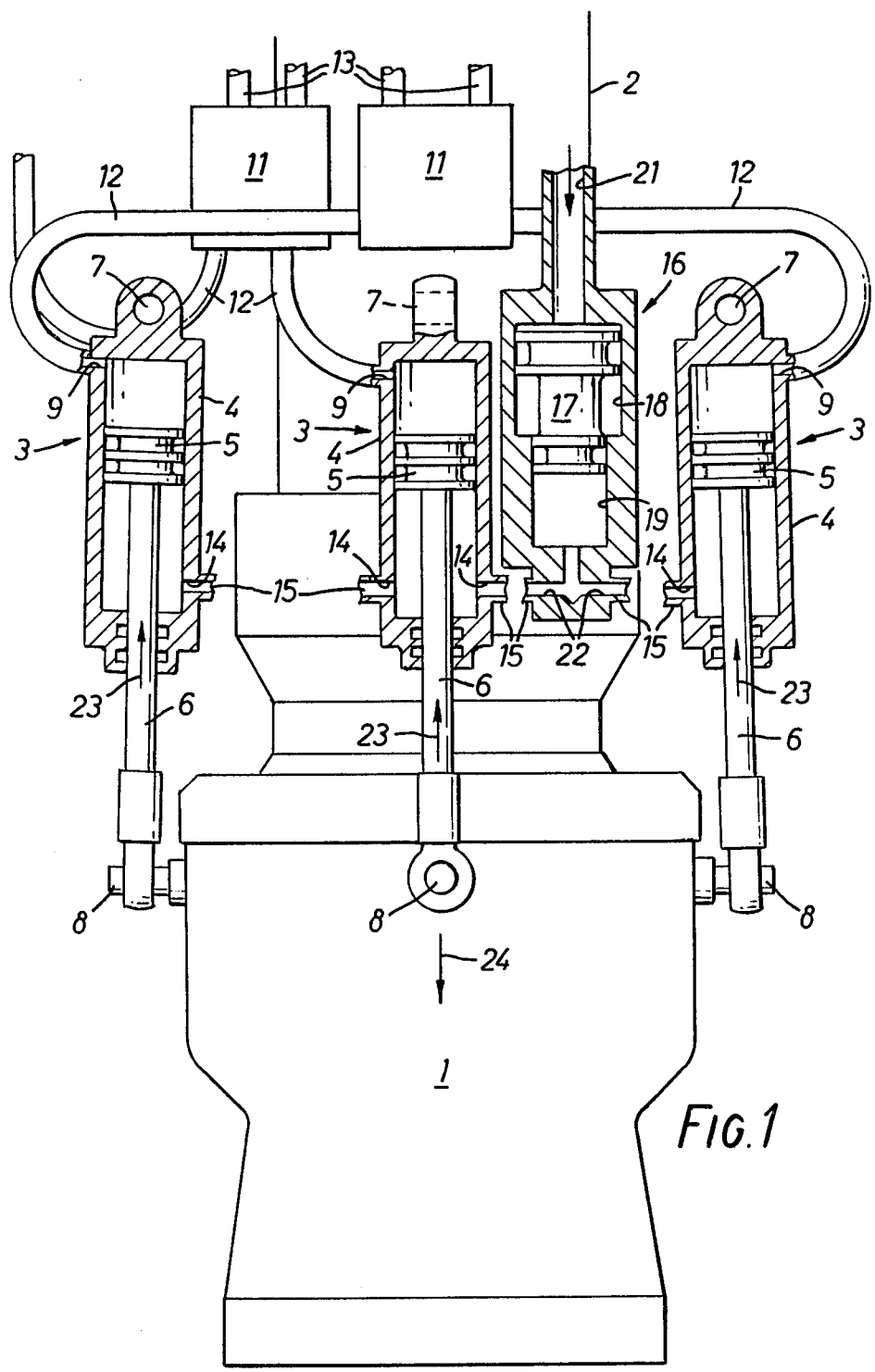
FIG. 1 is an elevation, partly in cross-section, of a first embodiment.

Referring to FIG. 1, this shows the rear end of a jet propelled guided missile comprising an exhaust nozzle 1 pivotally mounted on the end of a jet pipe 2 leading to a gas generator (not shown) such as a rocket motor providing a jet of hot gas to effect propulsion of the missile. The nozzle 1 is mounted for universal pivotal movement on a part-spherical bearing which is not seen in FIG. 1. Pivotal movement of the nozzle 1 to effect vehicle steering in pitch and/or yaw is achieved by four identical hydraulic actuators 3 equiangularly spaced around the axis of the nozzle exteriorly of the latter. Each actuator 3 comprises a cylinder 4 housing a piston head 5 and a piston rod 6, with the cylinder pivotally mounted on the body (not shown) of the missile by a pivot 7. In turn, the outer end of the piston rod 6 is pivotally attached to the nozzle 1 by a pivot 8, the axis of each pivot 8 and the pivot centre of the nozzle 1 lying in a common plane. The upper end of each cylinder 4, as seen in FIG. 1, has a port 9 for admission of hydraulic fluid to extend the actuator and pivot the nozzle 1. Diametrically opposed pairs of cylinders 4 have the admission of fluid to the inlets 9 controlled by a valve 11, the inlets being connected to the appropriate valve outlets by pipes 12. Inlets 13 of the valves 11 are connected to a source of hydraulic power (not shown) such as an expulsion actuator or a closed loop hydraulic system which may rely on the rocket motor gas pressure as a source of motive power.

The lower end, as seen in FIG. 1, of each cylinder 4 has a port 14, these ports of the four actuator cylinders being interconnected by pipes 15. The volumes of the cylinders 4 below the respective piston heads 5, together with the interconnecting pipes 15, are filled with hydraulic fluid and form an hydraulic suspension for the nozzle 1 which is isolated hydraulically from the control system of the actuators 3. The hydraulic suspension is pressurised by an actuator 16 comprising a liquid/gas separator differential piston 17 acting in concentric cylinders 18,19. The cylinder 18 has a port 21 connected to the output of the rocket motor so that on operation of the motor, gas therefrom moves the differential piston 70 downwardly, as seen in FIG. 1, and hence pressurises the hydraulic fluid in the hydraulic suspension since the cylinder 17 is connected in series with one of the pipes 15 via ports 22. When the hydraulic fluid in the suspension is pressurised, the pressure in the lower parts of the actuator cylinders 4 is increased, the pressurised fluid acting on the underside of the piston heads 5 and as a result imparting a tensile force in the piston rods 6 in the direction indicated by arrows 23.

When the rocket motor is operative, the gas jet issuing from the jet pipe 2 into the nozzle 1 acts on the latter and creates a load force on the nozzle bearing in the direction indicated by the arrow 24 which is seen to be opposite that of the tensile force in the piston rods 6, which force is imparted to the nozzle 1 since the piston rods are connected thereto. Thus, the tensile force offsets the bearing load force, whereby the power required of the actuators 3 to pivot the nozzle 1 when the missile is to be steered is less than would otherwise be required if the bearing load force were not counteracted. In this embodiment, the hydraulic suspension is pressure referenced to the rocket motor output which is the cause of the bearing load to be counteracted. The precise amount of counteraction of the bearing load is determined by the area ratio of the differential piston 17.

If it is desired to pivot the nozzle 1 to steer the missile, an appropriate signal is applied to one or both valves 11 which results in one of a pair of actuators 3 being extended and the other retracted. This means that the suspension fluid in the extended actuator or actuators is forced from the associated cylinder 4 and merely passed to the retracted actuator or actuators which has an increased volume to be filled by suspension fluid, the decrease in volume of control or actuation fluid resulting in fluid being exhausted via the associaated valve 11. Thus, the hydraulic suspension remains fully operative even when nozzle movement is effected. The hydraulic suspension is dimensioned to allow for volumetric changes due to hydraulic fluid expansion and contraction arising out of changes in temperature, the effect of the oil bulk modulus, and for volumetric changes within the pipework caused by pressure changes.

In view of the relatively large bearing area of a part-spherical bearing, the coefficient of friction is high particularly when the bearing is subjected to a load by the gas jet from the rocket motor so that a considerable advance is afforded by the present invention in reducing or eliminating the effect of the bearing load caused by gas jet.

Figures 2, 3:
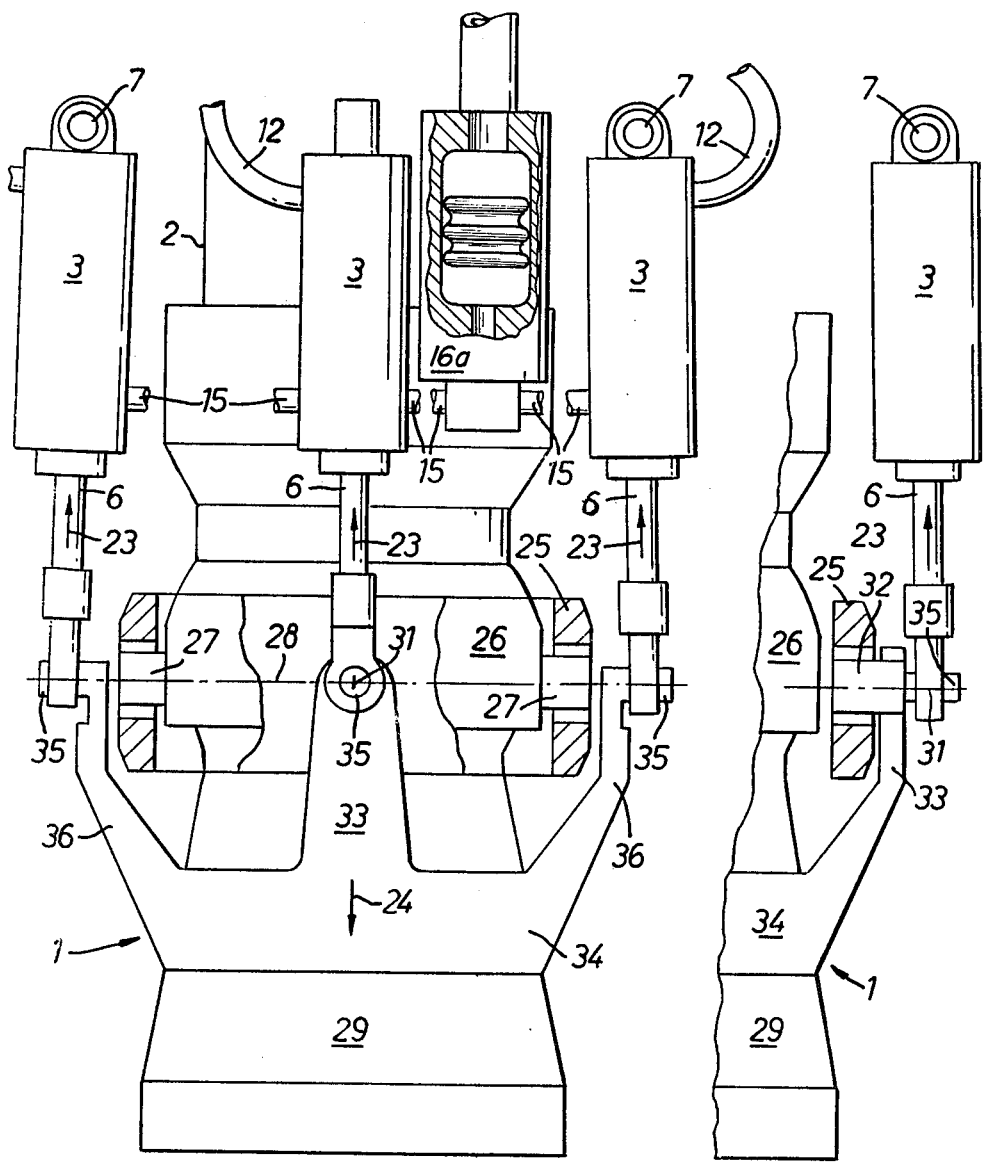
FIG. 2 is a view generally similar to that of FIG. 1 of a second embodiment.
FIG. 3 is a partial view seen from the right hand side of FIG. 2.

Referring now to FIGS. 2 and 3, the second embodiment is identical to the first save for the manner in which the nozzle 1 is mounted for universal pivotal movement and the manner in which the hydraulic suspension is pressurized, that is, by means of a flexible bag or bellows 16a. Instead of the part-spherical bearing employed in the first embodiment, the nozzle is mounted in a gimbal ring 25 which has been broken away and shown partly in cross-section in FIGS. 2 and 3. The gimbal ring 25 is carried by a stationary part 26 of the nozzle 1 on two diametrically opposed bearings 27, whereby the gimbal ring can pivot about an axis 28. A movable part 29 of the nozzle 1 is pivotally mounted on the gimbal ring 25 for movement about an axis 31 by two diametrically opposed bearings 32 via respective arms 33 of a bracket 34 attached to the movable nozzle part 29. The arms 33 also carry pivots 35 to which are attached the outer ends of the piston rods 6 of an opposed pair of the actuators 3. Similar pivots 35 are provided on two other arms 36 of the bracket 34 for attachment of the outer ends of the piston rods 6 of the other pair of actuators 3. The two axes 28 and 31 are orthogonal.

As in the first embodiment, the axes of the pivots 35 and the pivot centre of the nozzle 1 lie in a common plane and the operation of the hydraulic suspension and the control of the actuators 3 to effect pivotal movement of the nozzle 1 is identical to that described in connection with the first embodiment.

As already mentioned, the suspension of a nozzle in a gimbal ring is more advantageous than the suspension in a part-spherical bearing having regard to the relative frictional characteristics, but is disadvantageous in respect of size and weight. However, with the use of the present invention to offset the load on the gimbal bearings 27 and 32 caused by the gas jet passing through the nozzle 1, the gimbal ring and associated components can be made less massive since they do not have to carry such a high bearing load and hence the resulting arrangement is more compact than it would otherwise be and yet advantage can still be taken of the relatively low frictional characteristics of a gimbal suspension.

Figure 4:
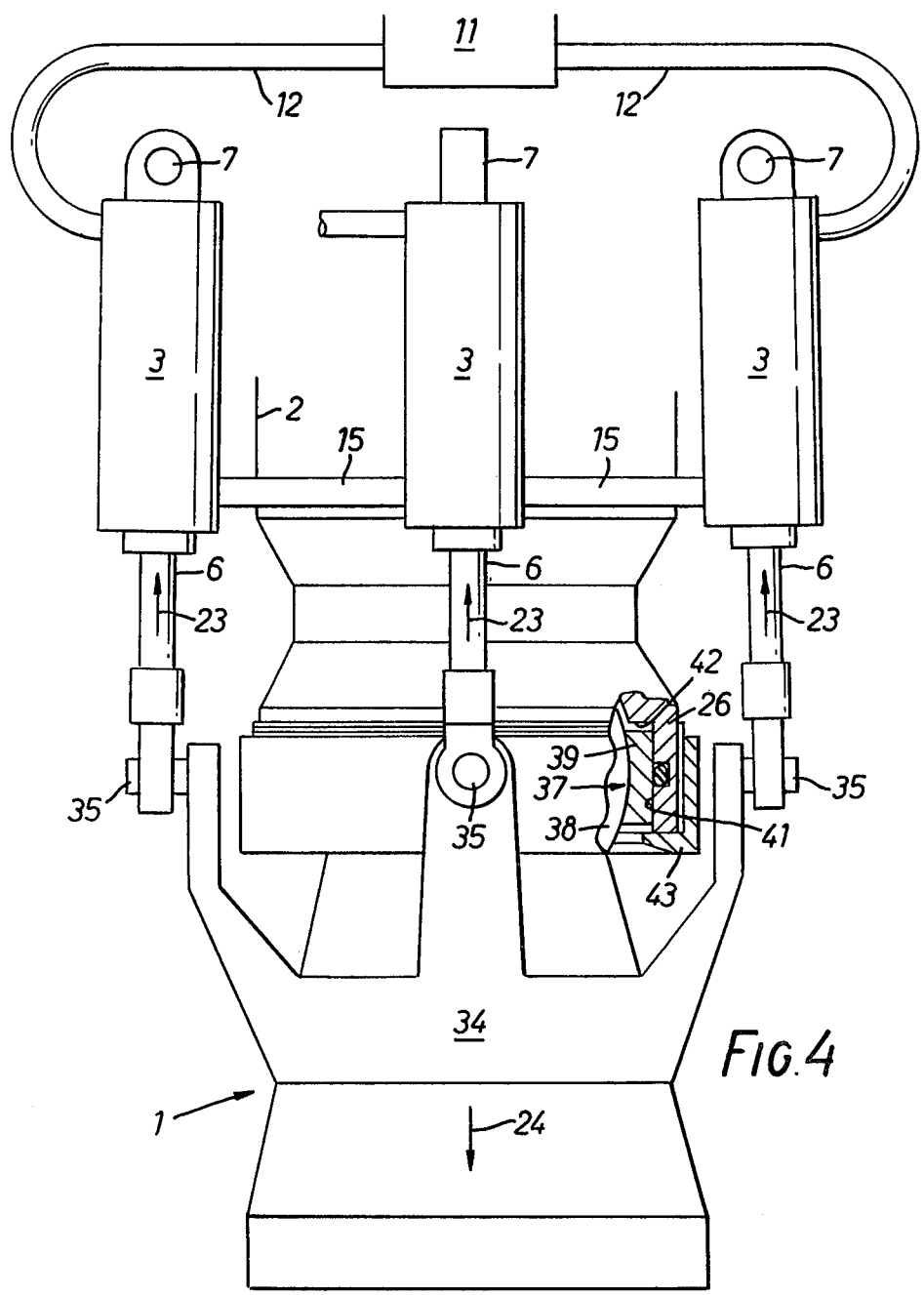
FIG. 4 is a view generally similar to that of FIG. 1 of a third embodiment.

The third embodiment shown in FIG. 4 employs a part-spherical bearing 37 to support the nozzle 1 for universal pivotal movement as did the fist embodiment but the movable part 29 of the nozzle is attached to the outer ends of the piston rods 6 of the actuators 3 via a bracket 34 and pivots 35 in a manner generally similar to that of the second embodiment, the axes of the pivots 35 and the pivot centre if the nozzle again being disposed in a common plane. However, in this embodiment the actuator 16 employed in the earlier embodiments to pressurise the hydraulic suspension for the nozzle is dispensed with and pressurisation is effected by permitting limited axial movement of the nozzle 1 when the latter is subjected to a bearing load by the gas jet from the rocket motor.

The part-spherical bearing 37 has an inner member 38 and an outer member 39 in the form of a ring mounted for sliding movement in a recess 41 provided in the stationary part of the nozzle 1. The extend to sliding movement of the outer bearing member 39 is limited in one direction by a shoulder 42 formed in the stationary nozzle part 26 and in the opposite direction by a retainer ring 43 attached to the part 26.

When the rocket motor is rendered operative, the gas jet issuing through the nozzle 1 imposes a load on the bearing 37 as in the other embodiments and in so doing, moves the movable nozzle part 29 axially downwardly as seen in FIG. 4. This axial movement is also imparted to the piston rods 6 and piston heads 5 of the four actuators 3, the movement of the piston heads pressurising the hydraulic fluid in the hydraulic suspension and hence producing a tensile force in the piston rods 6 in a sense to oppose the load force on the bearing 37 created by the gas jet as described in detail in connection with the first embodiment. Thus, the pressure in the hydraulic suspension will be in equilibrium with the force exerted on the movable nozzle part at any given instant, provided the outer bearing member 39 is not in engagement with the stop formed by the retainer ring 43. The hydraulic suspension of this embodiment cannot be arranged to counteract all the bearing load created by the gas jet since the latter still acts on the outer bearing member 39 even when the nozzle 1 is actively supported by the hydraulic suspension.

The stops formed by the shoulder 42 and the retainer ring 43 are set to allow for expansion and contraction of the hydraulic fluid in the hydraulic suspension due to temperature variations.

It will be seen that in all of the described embodiments of the present invention, the load force on the bearing or suspension arrangement of the nozzle 1 is offset by a desired amount, whereby the force necessary to effect pivotal movement of the nozzle to steer the missile is reduced which in turn means that the bearing or suspension can be made more compact and lightweight which is highly desirable.

The actuators 3 may physically be reversed without affecting the operation thereof and may be of different construction to that shown such as, for example, of the through-rod type or of the rotary vane type with pressure and suspension fluid acting on opposite sides of the vane. Furthermore, the actuator 16 used to pressurise the hydraulic suspension may be replaced by any actuation device such as bellows or a flexible bag 16a (FIG. 2) which is deformable on the application of exteriorly-applied pressure to increase the internal pressure and pressurise the hydraulic suspension.

What we claim is:

1. A suspension system for a pivotal nozzle of a jet propelled vehicle having a gas generator operable to effect propulsion of the vehicle, the system comprising a plurality of actuators connected to the exhaust nozzle and operable to effect pivotal movement thereof to steer the vehicle in a desired direction, each actuator comprising a movable member connectible on one side to a source of fluid power to effect nozzle movement with the other side of the member being interconnected with said other side of each other actuator movable member to form a fluid suspension for the nozzle, in use the suspension being pressurised to produce a force acting on the nozzle in a direction opposite to the load imposed on the nozzle by the gas from the gas generator acting thereon.

2. A system according to claim 1, wherein the fluid suspension is pressurised by means having an input connected, in use, to the gas generator so that the suspension is pressure referenced to the gas generator.

3. A system according to claim 2, wherein said means is in the form of an actuator comprising a liquid/gas separator differential piston acting in concentric cylinders.

4. A system according to claim 2, wherein said means is in the form of bellows.

5. A system according to claim 2, wherein said means is in the form of a flexible bag which is deformable by exteriorly-applied pressure to increase the internal pressure and pressurise the fluid suspension.

6. A system according to claim 1, wherein the pivotal nozzle is mounted so as to be movable relative to the actuators as a result of the load imposed on the nozzle by the gas from the gas generator, such movement resulting in pressurisation of the fluid suspension.

7. A system according to claim 6, wherein the nozzle is pivotable about a part-spherical bearing comprising an outer member in the form of a ring mounted for limited sliding movement in a recess provided in a stationary part of the nozzle.

8. A system according to claim 1, wherein the nozzle is mounted for universal pivotal movement about a part-spherical bearing.

9. A system according to any of claim 1 wherein the nozzle is mounted for universal pivotal movement in a gimbal ring.

10. A system according to claim 1, wherein each actuator is in the form of a hydraulic piston and cylinder.

* * * * *